(12) United States Patent
Saha et al.

(10) Patent No.: US 12,296,488 B2
(45) Date of Patent: May 13, 2025

(54) METHOD AND SYSTEM TO DETECT AND ESTIMATE DYNAMIC OBSTACLES USING RGB-D SENSORS FOR ROBOT NAVIGATION

(71) Applicant: Tata Consultancy Services Limited, Mumbai (IN)

(72) Inventors: Arindam Saha, Kolkata (IN); Ranjan Dasgupta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 212 days.

(21) Appl. No.: 18/059,133

(22) Filed: Nov. 28, 2022

(65) Prior Publication Data

US 2023/0286155 A1    Sep. 14, 2023

(30) Foreign Application Priority Data

Mar. 10, 2022   (IN) .............................. 202221013177

(51) Int. Cl.
*G06V 20/58*     (2022.01)
*B25J 9/16*      (2006.01)

(52) U.S. Cl.
CPC .................................. *B25J 9/1666* (2013.01)

(58) Field of Classification Search
CPC .............................. B25J 9/1666; G06V 20/58
(Continued)

(56) References Cited

U.S. PATENT DOCUMENTS 7,974,460 B2    7/2011  Elgersma
10,282,902 B1 * 5/2019  Mishra ................... G06T 17/20
(Continued)

FOREIGN PATENT DOCUMENTS

CN    110135331 A  *  8/2019
CN    113607161 A  *  11/2021
(Continued)

OTHER PUBLICATIONS

CN 110135331.translate; Bian et al.; Humanplus Intelligent Robotics Tech Beijing Co Ltd; Interactive behavior detection method, device and system, equipment andstorage medium. (Year: 2019).*
(Continued)

*Primary Examiner* — B M M Hannan
(74) *Attorney, Agent, or Firm* — FINNEGAN, HENDERSON, FARABOW, GARRETT & DUNNER LLP

(57) ABSTRACT

This disclosure relates generally to method and system to detect and estimate dynamic obstacles using Red Green Blue-Depth RGB-D sensors for robot navigation. Obstacle detection and tracking tasks with efficient processing of depth images becomes complex in dynamic and cluttered environments. The method detects one or more obstacles being identified in the one or more depth images in two dimensional space using the depth map captured using a Red Green Blue-Depth RGB-D sensor configured to a mobile robot. Further, a restricted v-depth map is computed between specified columns taken from the width of each dynamic obstacle of the u-depth map and within the depth range derived from the u-depth map. The one or more dynamic obstacles are tracked by matching segments of subsequent depth images to predict future position in the region of the monitoring environment by computing a closeness signature. The method evaluates correctness with open data sequence and real world data.

18 Claims, 13 Drawing Sheets

(58) Field of Classification Search
USPC .......................................................... 700/255
See application file for complete search history.

(56) References Cited

U.S. PATENT DOCUMENTS

| | | | |
|---|---|---|---|
| 10,499,031 B2 | 12/2019 | Ayari et al. | |
| 10,937,325 B2 | 3/2021 | Pohl et al. | |
| 2013/0182904 A1* | 7/2013 | Zhang | G06V 40/103 382/103 |
| 2017/0178352 A1* | 6/2017 | Harmsen | G05D 1/106 |
| 2017/0216728 A1* | 8/2017 | Logan | A63F 13/213 |
| 2018/0322646 A1* | 11/2018 | Matthies | G08G 5/0069 |
| 2019/0051056 A1* | 2/2019 | Chiu | G06F 16/903 |
| 2019/0080462 A1* | 3/2019 | Jung | G06V 20/64 |
| 2019/0325644 A1* | 10/2019 | Bleyer | G06T 17/20 |
| 2020/0167993 A1* | 5/2020 | Chen | G06V 20/10 |
| 2020/0265609 A1* | 8/2020 | Lee | G06T 7/97 |
| 2020/0294311 A1* | 9/2020 | Holz | H04N 13/271 |
| 2020/0351537 A1* | 11/2020 | Browy | G06T 19/003 |
| 2022/0004344 A1* | 1/2022 | Hayakawa | G06F 3/126 |
| 2022/0187841 A1* | 6/2022 | Ebrahimi Afrouzi | G05D 1/0274 |
| 2023/0195854 A1* | 6/2023 | Ip | G01C 21/1656 701/409 |

FOREIGN PATENT DOCUMENTS

| | | | |
|---|---|---|---|
| CN | 113607161 B | * | 3/2022 |
| CN | 111382637 B | * | 8/2023 |
| JP | 2020087407 A | * | 6/2020 |
| JP | 7389729 B2 | * | 11/2023 |
| KR | 20180065048 A | * | 6/2018 |
| WO | WO-2022054422 A1 | * | 3/2022 |

OTHER PUBLICATIONS

CN109102541A.translate; Chenyang et al.; Ningbo Yingxin Information Tech Co Ltd; A distance measuring method and a device of a smartphone integrated with adepth camera (Year: 2018).*
CN113607161A.translate; Liu et al.; Shenzhen Pudu Tech Co Ltd; Robot navigation path width acquisition system and method, robot and storage medium. (Year: 2021).*
Desheng Xie et al., "Obstacle detection and tracking method for autonomous vehicle based on three-dimensional LiDAR," Multi-Modal Fusion for Robotics—Research Article, 2019, Research Gate, https://journals.sagepub.com/doi/pdf/10.1177/1729881419831587.
Jiahao Lin et al., "Robust Vision-based Obstacle Avoidance for Micro Aerial Vehicles in Dynamic Environments," Robotics, 2020, Arxiv, https://www.researchgate.net/publication/321136821_Entrepreneurial_competencies_and_financial_performance_of_farmers_in_South_Africa/link/5a380aab0f7e9b7c486f7855/download.
Adrian Carrio et al., "Drone detection using depth maps," Robotics, 2018, Arxiv, https://arxiv.org/pdf/1808.00259.pdf.

* cited by examiner

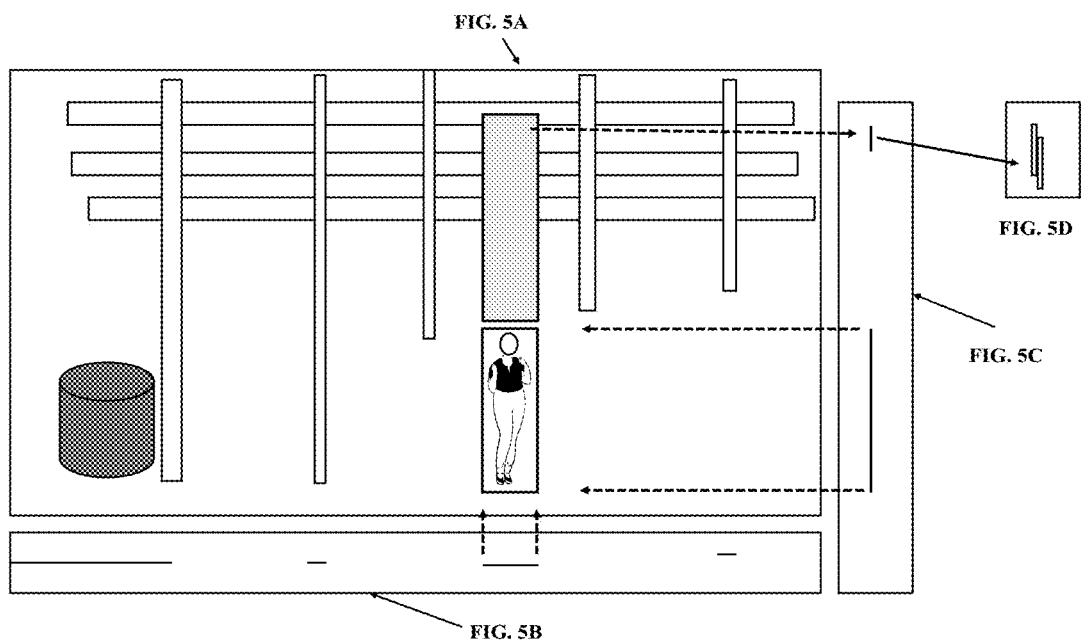

METHOD AND SYSTEM TO DETECT AND ESTIMATE DYNAMIC OBSTACLES USING RGB-D SENSORS FOR ROBOT NAVIGATION

PRIORITY CLAIM

This U.S. patent application claims priority under 35 U.S.C. § 119 to: Indian Patent Application number 202221013177, filed on Mar. 10, 2022. The entire contents of the aforementioned application are incorporated herein by reference.

TECHNICAL FIELD

The disclosure herein generally relates to obstacle detection, and, more particularly, to method and system to detect and estimate dynamic obstacles using Red Green Blue-Depth RGB-D sensors for robot navigation.

BACKGROUND

Service robots are envisioned to support humans in a variety of monitoring activities such as fetching and carrying objects. Therefore, robots are equipped with a sensor set-up that allows close and safe interaction with obstacles while navigating through monitoring environments. Common to these application robot should be able to navigate in a cluttered 3D environment, to detect and recognize obstacles. Considerably, obstacle detection and tracking is an active research area for its applicability to autonomous driving or navigation. Obstacle detection is an important task for autonomous navigation of robots. Here, the task becomes more complex in dynamic and cluttered environments. In this context Red Green Blue-Depth RGB-D camera is one of the most common devices that provides a quick and good estimation of the environment in the form of RGB and depth images. Efficient processing of depth image is crucial for obstacle detection and tracking.

Traditional approaches use both active and passive sensors for obstacle detection and tracking. Active sensors such as ultrasonic have been widely used for dynamic obstacle detection and passive sensors such as stereo cameras for distance calculation of obstacles through disparity measurement from image pairs have limitations within vision sensors. Autonomous ground vehicle provides intense focus on disparity processing, where u-disparity and v-disparity image formation from a stereo disparity explains properties for object identification after ground plane segmentation. This technique focuses on detecting obstacles that mainly stand on the ground plane like other vehicles, trees, pedestrians, and thereof. In low latency obstacle avoidance system uses u-disparity for fast obstacle detection in cluttered environments but dynamic obstacles are kept out of the scope. Further, low-cost RGB-D camera (for example RealSense D400®) gains popularity due to technological advancement in terms of capabilities in indoor and outdoor, reduction in weight and form factor. These small, lightweight cameras are perfect to fit on Micro Aerial Vehicle (MAV) and focus on detecting obstacles from RGB-D cameras. In another conventional approach for dynamic obstacle segmentation a depth map is converted to a point cloud, the planer road is segmented out and all leftover points are considered as obstacles. This approach differentiates static and dynamic obstacles using the DECOLOR algorithm and demands high computations to process point cloud and unfit for MAV. In another conventional approach for obstacle detection and tracking system for teleoperated UAV that uses a bin occupancy filter that breaks the entire visible region into smaller bins and the presence of an obstacle into a bin is searched in a probabilistic way. While most of the existing approaches evolved to detect static obstacles but have failed to satisfy requirements for detecting and tracking dynamic obstacles by processing depth images obtained from RGB-D cameras.

SUMMARY

Embodiments of the present disclosure present technological improvements as solutions to one or more of the above-mentioned technical problems recognized by the inventors in conventional systems. For example, in one embodiment, a system to detect and estimate dynamic obstacles using RGB-D sensors for robot navigation is provided. The system includes capturing one or more depth images using a depth camera module including a RGB-D sensor configured to a mobile robot navigating through a monitoring environment and constructing a u-depth map using the one or more depth images. The obstacle detection module detects one or more obstacles comprising of at least one of a static or a dynamic in two dimensional space using the u-depth map by, (i) converting, the u-depth map into binary images based on a dynamic threshold using an image processing technique, (ii) estimating, a width of each obstacle based on the width of segmented white patch from the u-depth map, and (iii) estimating, a depth range of each obstacle between a minimum and a maximum row index of the segmented white patch from the u-depth map. The obstacle detection module computes height of obstacle from a restricted v-depth map between specified columns taken from the width of each obstacle of the u-depth map and within the depth range derived from the u-depth map, a height of each obstacle from the restricted v-depth map and transforming the height and width of one or more obstacles from the two dimensional image coordinates into a three-dimensional camera coordinates c. The obstacle tracking module creates signatures of each obstacle from their appearances in the u-depth map. The obstacle tracking module further tracks the one or more obstacles by matching closeness of signatures of detected obstacles on subsequent u-depth images.

The dynamic obstacle estimation module estimates the dynamic obstacles by converting the obstacles identified in the three-dimensional camera coordinates c into a world coordinate w and identifying dynamic obstacles based on velocity estimation is above a predefined threshold value. The velocities of dynamic obstacles are used to predict future positions of dynamic obstacles in the region of the monitoring environment.

In accordance with an embodiment of the present disclosure, the restricted v-depth map estimates accurate height of each obstacle.

In accordance with an embodiment of the present disclosure, the obstacles are tracked by comparing structural properties of obstacle appearance in the u-depth map by creating a signature of obstacle patch in the u-depth map, and iteratively for the one or more obstacles a closeness signature is searched within neighboring vicinity based on a shape alignment of each obstacle.

In accordance with an embodiment of the present disclosure, the signature is the shape alignment of obstacle in a u-depth map which is formed with a set of vectors and a centroid. The vectors are formed with pixels that are taken from the contour of the obstacle in u-depth map. The centroid is the average coordinate position of all pixels that are taken from the contour of the obstacle in u-depth map.

In accordance with an embodiment of the present disclosure, the closeness of signatures is computed with the sum of differences derived between vectors of obstacle's signature identified in the previous depth image and the vectors of obstacle's signature identified in the next depth image starting from minimum column index.

In accordance with an embodiment of the present disclosure, difference between vectors is computed with a sum of angle difference and squared length difference.

In another aspect, a method for detecting and estimating dynamic obstacles using Red Green Blue-Depth RGB-D sensors for robot navigation is provided. The method includes capturing one or more depth images using a depth camera module including a RGB-D sensor configured to a mobile robot navigating through a monitoring environment and constructing a u-depth map using the one or more depth images. The obstacle detection module detects one or more obstacles comprising of at least one of a static or a dynamic in two dimensional space using the u-depth map by, (i) converting, the u-depth map into binary images based on a dynamic threshold using an image processing technique, (ii) estimating, a width of each obstacle based on the width of segmented white patch from the u-depth map, and (iii) estimating, a depth range of each obstacle between a minimum and a maximum row index of the segmented white patch from the u-depth map. The obstacle detection module computes height of obstacle from (i) restricted v-depth map between specified columns taken from the width of each obstacle of the u-depth map and within the depth range derived from the u-depth map, a height of each obstacle from the restricted v-depth map and transform the height and width of one or more obstacles from the two dimensional image coordinates into a three-dimensional camera coordinates c. The obstacle tracking module creates signatures of each obstacle from their appearances in the u-depth map. The obstacle tracking module further tracks the one or more obstacles by matching closeness of signatures of detected obstacles on subsequent u-depth images. The dynamic obstacle estimation module estimates the dynamic obstacles by converting the obstacles identified in the three-dimensional camera coordinates c into a world coordinate w and identifying dynamic obstacles based on velocity estimation is above a predefined threshold value. The velocities of dynamic obstacles are used to predict future positions of dynamic obstacles in the region of the monitoring environment.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to capture one or more depth images using a depth camera module including a Red Green Blue-Depth RGB-D sensor configured to a mobile robot navigating through a monitoring environment and constructing a u-depth map using the one or more depth images. The obstacle detection module detects one or more obstacles comprising of at least one of a static or a dynamic in two dimensional space using the u-depth map by, (i) converting, the u-depth map into binary images based on a dynamic threshold using an image processing technique, (ii) estimating, a width of each obstacle based on the width of segmented white patch from the u-depth map, and (iii) estimating, a depth range of each obstacle between a minimum and a maximum row index of the segmented white patch from the u-depth map. The obstacle detection module computes height of obstacle from a restricted v-depth map between specified columns taken from the width of each obstacle of the u-depth map and within the depth range derived from the u-depth map, a height of each obstacle from the restricted v-depth map and transform the height and width of one or more obstacles from the two dimensional image coordinates into a three-dimensional camera coordinates c. The obstacle tracking module creates signatures of each obstacle from their appearances in the u-depth map. The obstacle tracking module further tracks the one or more obstacles by matching closeness of signatures of detected obstacles on subsequent u-depth images. The dynamic obstacle estimation module estimates the dynamic obstacles by converting the obstacles identified in the three-dimensional camera coordinates c into a world coordinate w and identifying dynamic obstacles based on velocity estimation is above a predefined threshold value. The velocities of dynamic obstacles are used to predict future positions of dynamic obstacles in the region of the monitoring environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5A through FIG. 5D illustrate estimation of width and height of an obstacle in two dimensional image coordinate from a u-depth map and a restricted v-depth map respectively using the system of FIG. 1, in accordance with some embodiments of the present disclosure.

DETAILED DESCRIPTION

Figure 1:
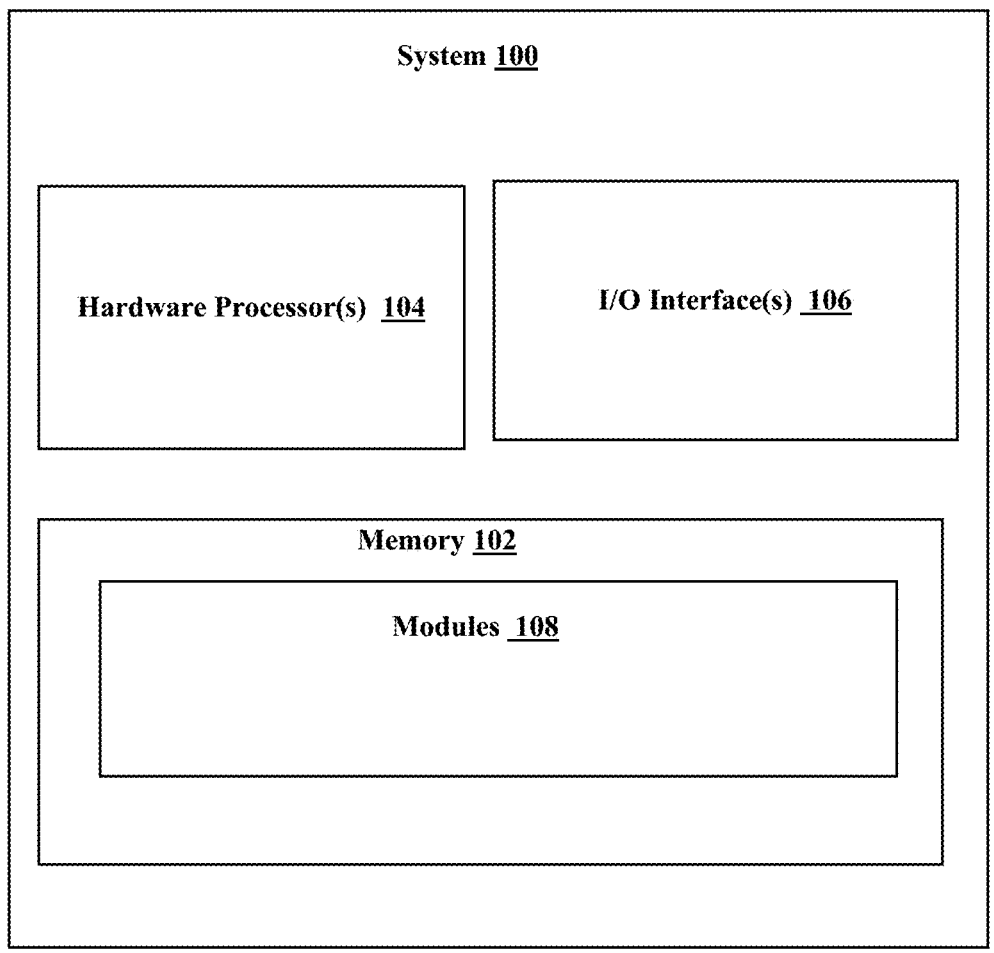
FIG. 1 illustrates an exemplary system 100 (alternatively referred as dynamic obstacle detection and tracking system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system to detect and track dynamic obstacles using Red Green Blue-Depth RGB-D sensors for robot navigation. The system herein may be alternatively referred as obstacle detection and tracking system 100. The system 100 includes a robot that comprises a RGB-D sensor to obtain one or more depth images with an independent two-axis or three-axis degree of freedom to detect and track a target, e.g., a person or an obstacle or point of interest, with the RGB-D camera independently of an actual flight direction or actual attitude of the robot. The method enables efficient processes of depth images for obstacle detection and tracking through the RGB-D camera configured to the robot navigating in a monitoring environment. The system 100 facilitates detection and quickly tracking and estimating of dynamic obstacles in subsequent frames of the monitoring environment for stable autonomous navigation.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrates an exemplary system 100 (alternatively referred as dynamic obstacle detection and tracking system), in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
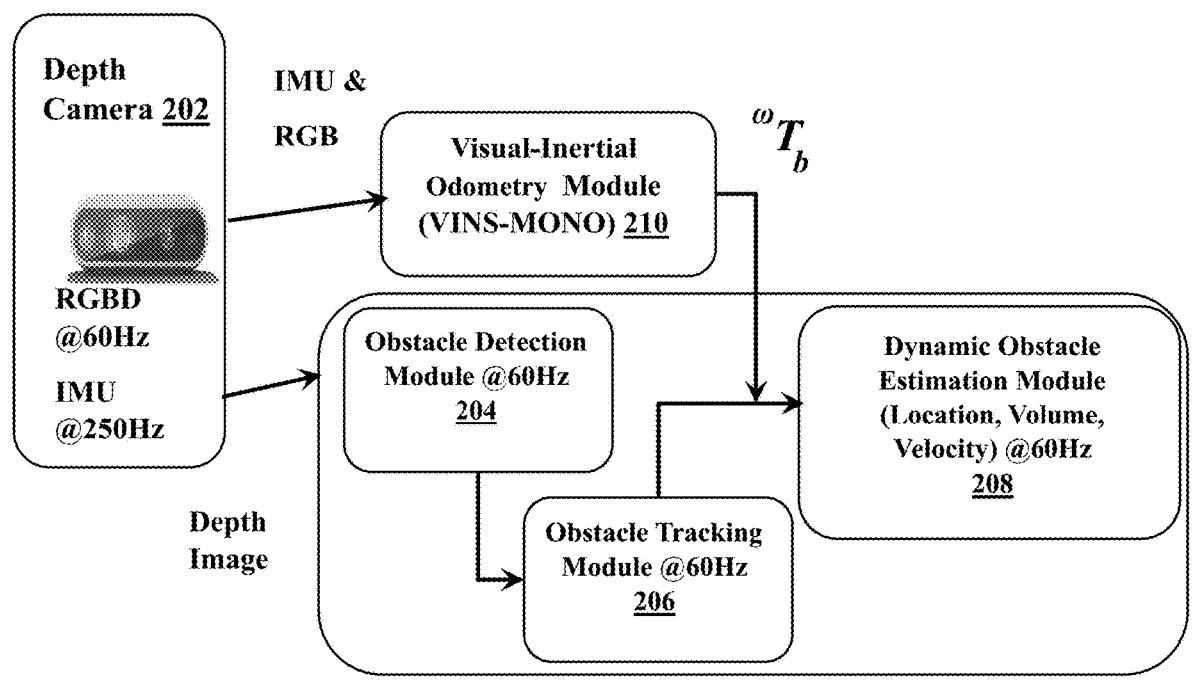
FIG. 2 is a functional block diagram of robust dynamic obstacle detection and tracking using Red Green Blue-Depth RGB-D cameras mounted on robot being navigating monitoring environment using the system of FIG. 1, in accordance with some embodiments of the present disclosure.

FIG. 2 is a functional block diagram of robust dynamic obstacle detection and tracking using Red Green Blue-Depth RGB-D cameras mounted on robot being navigating monitoring environment using the system of FIG. 1, in accordance with some embodiments of the present disclosure. FIG. 2 includes a plurality of modules comprising a depth camera module 202, an obstacle detection module 204, an obstacle tracking module 206, a dynamic obstacle estimation module 208, and a visual inertial odometry module 210, The depth camera module 202 captures one or more depth images using a Red Green Blue-Depth RGB-D sensor configured to a mobile robot which navigates through a monitoring environment.

The obstacle detection module 204 detects obstacle being identified in the monitoring environment using the depth images captured via the Red Green Blue-Depth RGB-D sensor.

The obstacle tracking module 206 tracks the detected obstacles in subsequent images.

The dynamic obstacle estimation module 208 identifies dynamic obstacles, estimates velocities of dynamic obstacles, and predicts future positions within a predicted zone of the environment being monitored. The velocity estimation is computed in the world coordinate frame w.

Figure 3A:
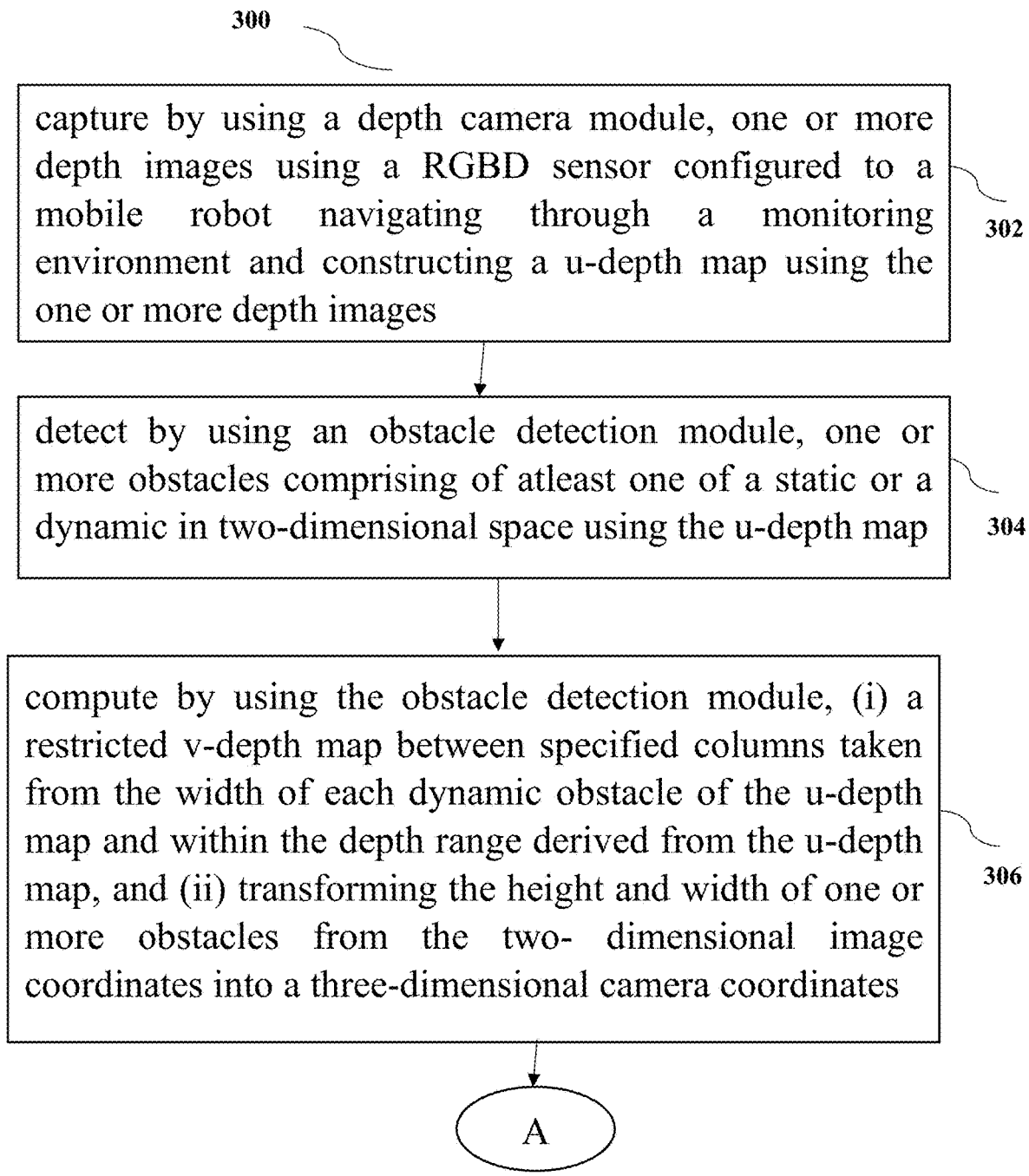
FIG. 3A and FIG. 3B illustrates an exemplary flow diagram illustrating a method to detect and track dynamic obstacles being identified in the monitoring environment using the system of FIG. 1, in accordance with some embodiments of the present disclosure.
Figure 3B:
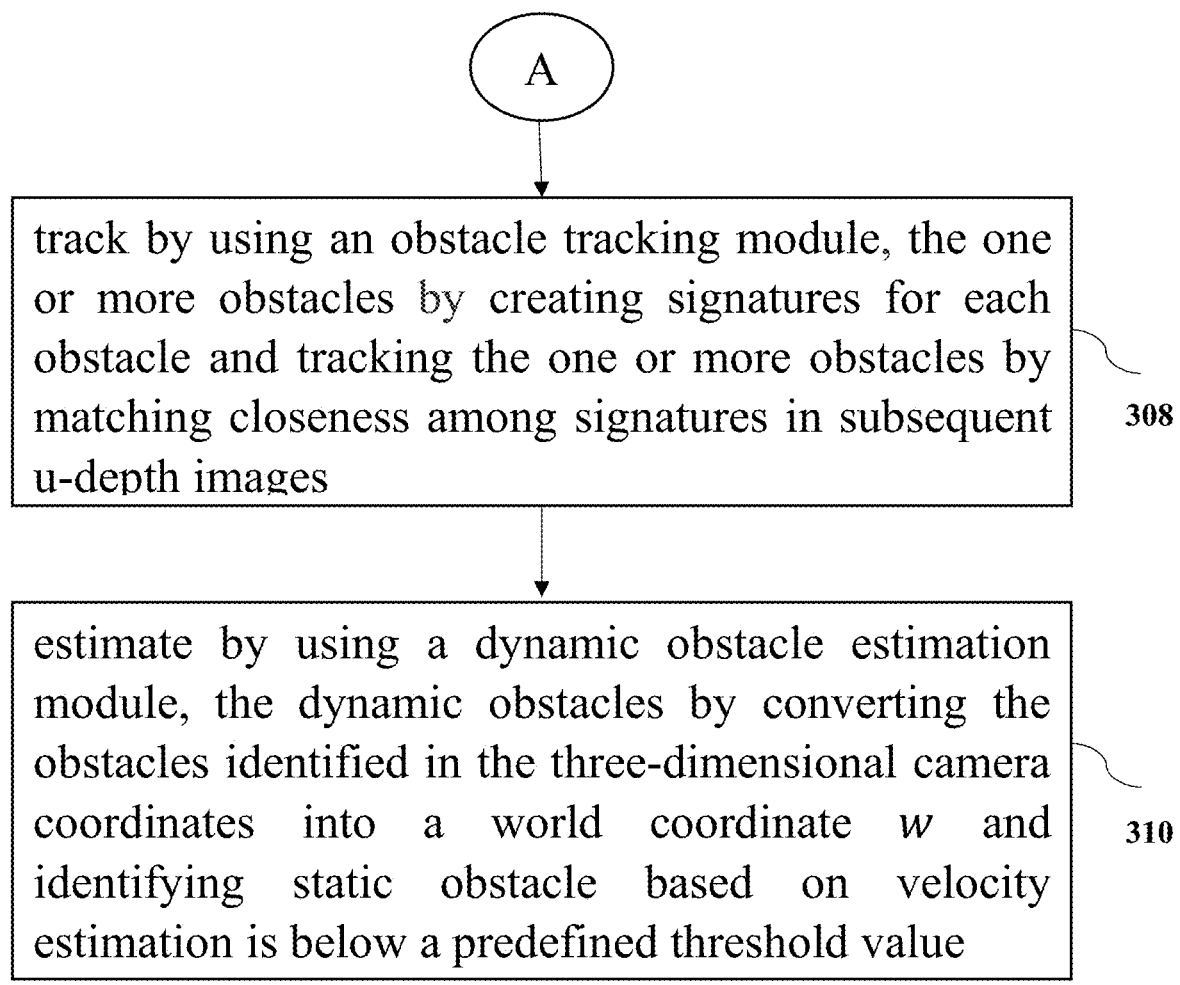

FIG. 3A and FIG. 3B illustrates an exemplary flow diagram illustrating a method to detect and track dynamic obstacles being identified in the monitoring environment using the system of FIG. 1, in accordance with some embodiments of the present disclosure. In an embodiment, the live video streaming system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the live video streaming system 100 as depicted in FIG. 2 through FIG. 7. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300 the one or more hardware processors 104 capture by using a depth camera module 202, one or more depth images using a Red Green Blue-Depth RGB-D sensor configured to a mobile robot navigating through a monitoring environment and construct a u-depth map using the one or more depth images. Considering an example, illustrating RGB-D camera image visualization where the RGB-D sensor configured to the mobile robot obtains the one or more depth images (FIG. 4A) of the navigating region associated with the monitoring environment. Further, the u-depth map is constructed using the one or more depth images.

Figure 4A:
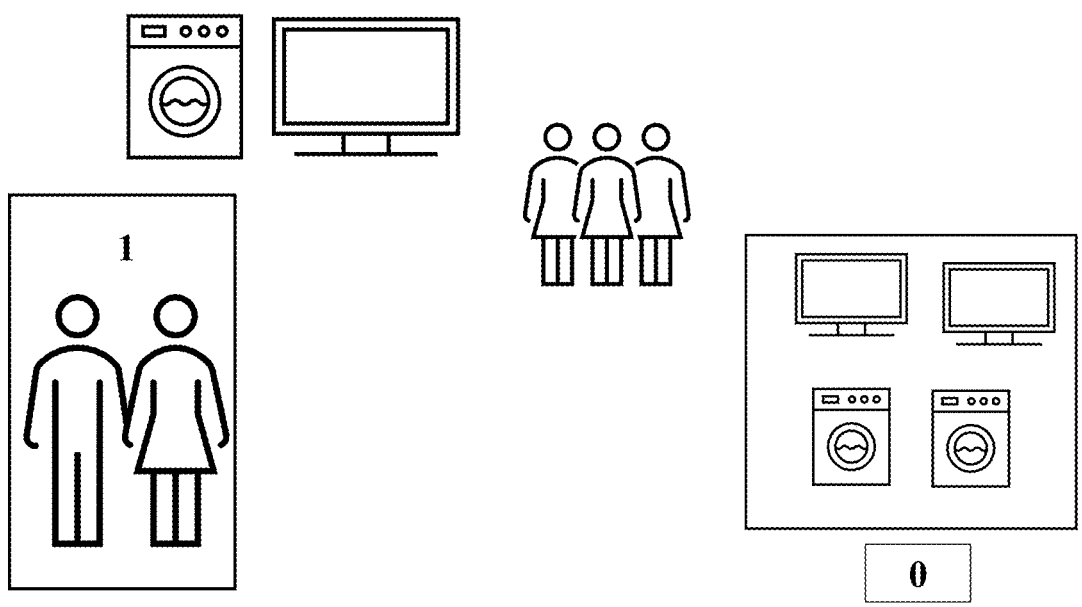
FIG. 4A illustrates an example Red Green Blue-Depth RGB-D camera image with static and dynamic obstacles and its annotations using the system of FIG. 1, in accordance with some embodiments of the present disclosure.
Figure 4B:
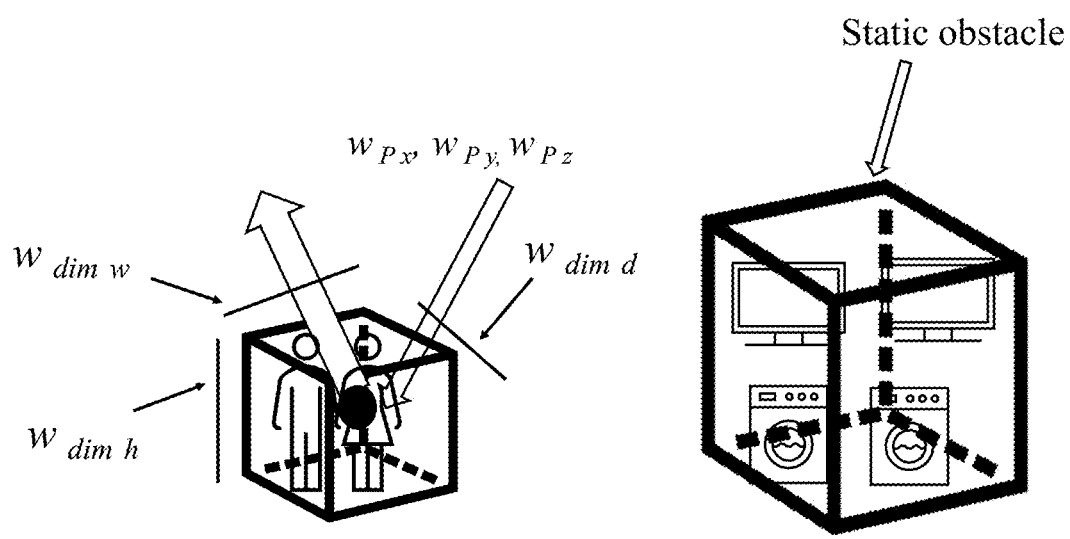
FIG. 4B illustrates an example RVIZ image visualization of detected at least one static obstacle and dynamic obstacle using the example of FIG. 4A in a form of three dimensional point cloud using the system of FIG. 1, in accordance with some embodiments of the present disclosure.

At step 304 of the method 300 the one or more hardware processors 104 detect by using an obstacle detection module 204, one or more obstacles comprising of at least one of a static and a dynamic (e.g., static obstacle(s) or a dynamic obstacle(s)) in two-dimensional (2D) space using the u-depth map. The one or more depth images are processed to detect one or more obstacles being identified in the monitoring environment. Referring now to FIG. 4B, where from the depth images captured via the Red Green Blue-Depth RGB-D camera detects at least one static obstacle and dynamic obstacle in the point cloud. The constructed u-depth map is a column-wise histogram representation of depth values from each depth image. Considering an example depth image (DImg) whose width is W, height is H, a total number of bins is N and the sensor range is up to depth d. Range of each bin is d/N and the resolution of u-depth map is W*N. The depth bins are on growing order from top to bottom in the u-depth map which means the row i corresponds to smaller depth than row j, $\forall i<j$. The depth bin corresponding to the obstacles becomes high and visible as white horizontal patches. The dimension of white horizontal patch provides corresponding obstacle's position and size with the segment these white patches in the u-depth map. Initially, the u-depth map is converted into binary images based on a dynamic threshold using an image processing technique.

In one embodiment, one or more basic image processing operations are performed on the u-depth map to achieve stable segmentation The first operation is computing binary thresholding where threshold value is dynamic and is represented as $T_{row} \propto uDImg_{row}$, means proportional with distance and provides more important to closer objects even with smaller size. The depth map is determined using a RealSense D435i® where the depth estimation is noisy and thus the u-depth map also contains some noise which makes these white patches discontinuous and very often a single obstacle can appear as two different obstacles. Further, a closing operation is performed on these white patches which essentially runs on a very small number of pixels and produces continuous patches quickly. Here, intensive morphological operations on the entire u-depth image are excluded for fast execution. The segment of these white horizontal patches are segmented by connected component analysis that provides a bounding box around the white horizontal patches as shown in FIG. 5A through FIG. 5D.

In another embodiment, a width of each dynamic obstacle is estimated based on the width of segmented white patch from the u-depth map. Then, a depth range of each obstacle is estimated between a minimum and a maximum row index of the segmented white patch from the u-depth map.

Figure 5E:
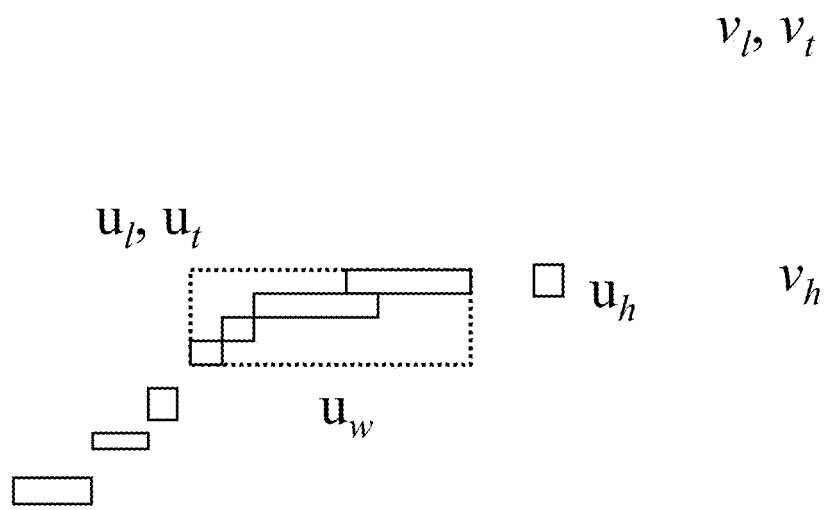
FIG. 5E and FIG. 5F illustrate the estimation of width and height of an obstacle in two dimensional image coordinate using the system of FIG. 1, in accordance with some embodiments of the present disclosure.
Figure 5F:
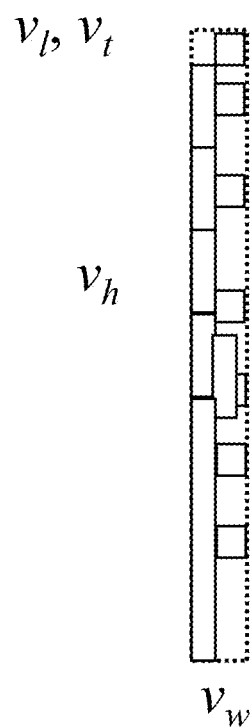

At step 306 of the method 300 the one or more hardware processors 104 compute by using an obstacle detection module 204, a restricted v-depth map which is a row wise histogram of depth values from depth image obtained between specified columns taken from the width of each dynamic obstacle of the u-depth map and within the depth range derived from the u-depth map, a height of each obstacle from the restricted v-depth map, and transform the height and width of one or more obstacles from the two dimensional image coordinates into a three-dimensional camera coordinates c. After detecting the one or more obstacles and estimating their two dimensional sizes in depth image, three dimensional parallelepiped shape of the one or more obstacles are determined with three dimensions size represented as ($c_{dim_h}$, $c_{dim_w}$, $c_{dim_d}$) and three dimensional position ($c_{P_x}$, $c_{P_y}$, $c_{P_z}$), where c denotes the camera coordinate frame. Referring to FIG. 4A and FIG. 5A which illustrates the example Red Green Blue-Depth RGB-D camera image with obstacles and its annotations to compute the dimensions of the bounding box around an obstacle on the depth map using the dimensions of the segmented white patch on the corresponding u-depth map. Consider the bounding box (FIG. 5E) with width $u_w$. The width of the corresponding rectangle on the u-depth map is the same as $u_w$ because the u-depth map contains a column-wise histogram, therefore the width remains the same. The height of the corresponding rectangle is the minimum and maximum row wise pixels that are having depth within the depth range $d_{min}$ and $d_{max}$ values are obtained. Further, the $d_{min}$ and $d_{max}$ values from the corresponding depth bin of $u_l$ and ($u_l+u_h$) respectively. Existing methods in the literature estimate height of an obstacle on depth image using the above mentioned technique, but this estimation holds true only if there is only one obstacle within column $u_l$ and ($u_l+u_w$) and the depth range between $d_{max}$ to $d_{min}$.

In one embodiment, FIG. 5A and FIG. 5D illustrates one such wrong height estimation of obstacle (with a tall bounding box) by calculating height from the topmost and bottom most coordinates points present on the depth images within column ranges $u_l$ and ($u_l+u_w$) and within the depth ranges $d_{max}$ to $d_{min}$ which is known in the state of the art. The wrong height estimation occurs when multiple obstacles present within the above mentioned column ranges and depth ranges. State of the art methods estimate a combined height of all obstacles present within the above mentioned column ranges and depth ranges. FIG. 5C represents the restricted v-depth map that found another small obstacle on the top which is illustrated in a magnified view in FIG. 5D.

Figure 4C:
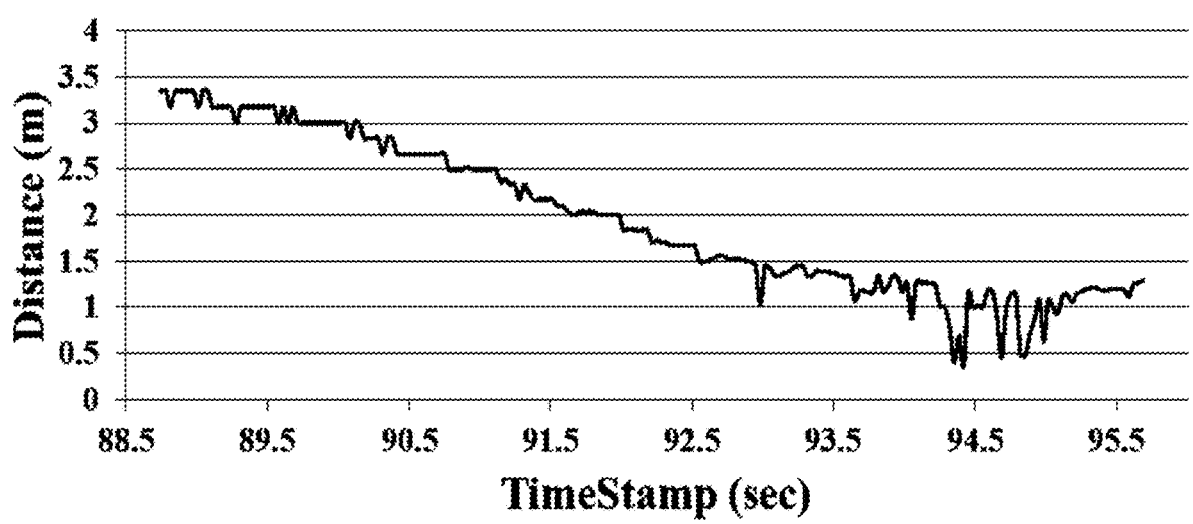
FIG. 4C illustrates an experimental graph showing changes in relative distances between dynamic obstacle of FIG. 4A and the Red Green Blue-Depth RGB-D camera using the system of FIG. 1, in accordance with some embodiments of the present disclosure.
Figure 4D:
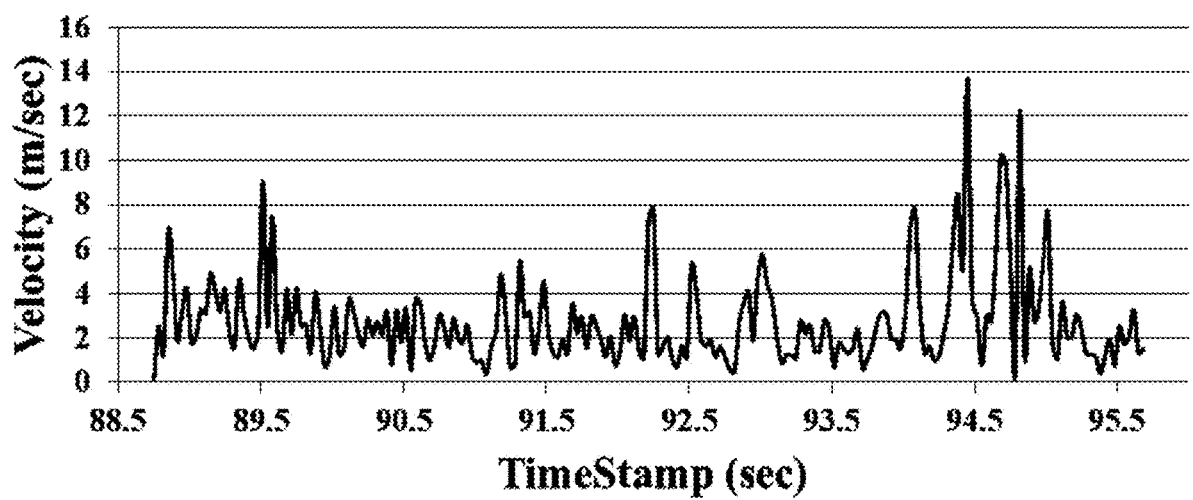
FIG. 4D illustrates an experimental graph showing corresponding changes in velocities of the dynamic obstacles of FIG. 4A in world coordinate (w) using the system of FIG. 1, in accordance with some embodiments of the present disclosure.

In one embodiment, the present method of the disclosure is evaluated for the indoor open sequences analysis shows market sequence of Open LORIS-Scene dataset. The dataset environment is a real-world departmental shop in indoor lighting conditions with multiple dynamic and static obstacles. The Red Green Blue-Depth RGB-D image is of 848×480 @30 Hz. FIG. 4A shows one such snapshot where the system tracks dynamic obstacle and calculates its velocity. FIG. 4B shows a RVIZ snapshot where dynamic obstacle is represented as parallelepiped and shows the dimensions. FIG. 4C shows the plot of relative distances of dynamic obstacle from the camera and FIG. 4D shows the plot of corresponding estimated velocities of the dynamic obstacle in the world coordinate frame. It is identified that the velocity calculation is noisy for erroneous localization estimation of VINS-MONO technique.

The restricted v-depth map produces multiple patches if there exist multiple obstacles on the same depth range (FIG. 5C) and patches are segmented with similar image processing techniques as to the u-depth map. The height of bounding box ($v_h$) in a restricted v-depth map (FIG. 5F) is the corresponding height of the rectangle on the depth image. The top-left corner of the corresponding bounding box in the depth image is ($u_l$, $v_t$) where the width is $u_w$ and the height is $v_h$. The dimensions are estimated (FIG. 5A and FIG. 5C) using the u-depth and the restricted v-depth maps. FIG. 5C shows the restricted v-depth map that detects a small obstacle on the top and rectifies the height calculation. This two-dimensional rectangle of the depth image is transformed into the three-dimensional camera frame using the relation between the image plane and the camera coordinate frame c. Equation 1 shows the relations to calculate these dimensions, $$c_{dim_d} = (d_{max} - d_{min}),$$

$$c_{P_x} = \frac{(2u_l + u_w - 2c_x) * c_{dim_d}}{4 f_x}$$

$$c_{dim_h} = \frac{(v_h * d_{max})}{f_y},$$

$$c_{P_y} = \frac{(2v_t + v_h - 2c_y) * c_{dim_d}}{4 f_x}$$

$$c_{dim_w} = \frac{(u_w * d_{max})}{f_x},$$

$$c_{P_z} = \frac{c_{dim_d}}{2}$$

Equation 1

Where $f_x$, $f_y$ are the focal lengths in image horizontal and vertical direction respectively, ($c_x$, $c_y$) denotes the principal point.

At step 308 of the method 300 the one or more hardware processors 104 track by using an obstacle tracking module the one or more obstacles by creating signatures for each obstacle and tracking the one or more obstacles by matching closeness among signatures in subsequent u-depth images. Tracking associates the detected obstacles in subsequent images. Usual methods to track is through associating visual features or using some probability function but we restricted to use any visual feature as these are computation heavy and tracking time grows with the size of an obstacle in the image frame. Here, limited number of pixels from the u-depth map is processed to track obstacles on subsequent frames. One popular way to match two image segments is through Hu-moments calculation where two images are compared with the associated structural properties. But the horizontal white patches do not contain such good structural properties and therefore, thus Hu-moments matching produces many false-positive results. This method provides simple matching algorithm, that first creates a signature for the obstacle patch in the u-depth map and searches for a closer signature within a neighboring vicinity. Another advantage of using a u-depth map is if any obstacle moves parallel to the optical direction of the camera, the corresponding position change in the u-depth map is very minimal and tracking works well. Only if any obstacle moves left to right or vice versa, the change in the u-depth map would be at the same rate.

Figure 6:
FIG. 6 illustrates an example to the formation of vectors in the process of creating signature of an obstacle using the system of FIG. 1, in accordance with some embodiments of the present disclosure.

In one embodiment, it is assumed that an obstacle A consists of a set of points $P_A$ from the u-depth map. There is another set of points $C_A \subset P_A$ that represents the contour of A. Now another set of ordered points $\Phi_A \subset C_A$ were created such that points $P_i$, $P_{i+1} \in \Phi_A \forall_i$ should be connected with a vector $\hat{l}_{i,i+1}$ and the vector should only pass through points from $C_A$ as shown in FIG. 6. These all vectors create a set $\Omega_A$ and $\|\Phi_A\|=\|\Omega_A\|$. The tuple $\{\Phi_A, \Omega_A, \mho_A\}$ creates the signature for the obstacle A where $\mho_A$ is the centroid. In order to match with another obstacle B found in the next depth image, calculate the closeness using the signatures of A&B. Initially, the shape of the obstacle B is aligned with the obstacle A by taking the difference $S_{A,B}=(\mho_A-\mho_B)$ and transform the signature of B with $S_{A,B}$. The closeness calculation follows the Equation 2 between signatures of A and transformed B.

$$\text{Cost}_{A,B} = \sum\nolimits_{i \in \Omega_A, j \in \Omega_B} \left( \hat{l}_{A_i} \odot \hat{l}_{B_j} \right) + \frac{1}{\partial} \left( \|\hat{l}_{A_i}\| - \|\hat{l}_{B_j}\| \right)^2 \quad \text{Equation 2}$$

Where, $\hat{l}_{A_i} \in \Omega_A$ and $\hat{l}_{B_j} \in \Omega_B$ and i,j starts from the left-most points from $\Phi_A$ and $\Phi_B$ respectively. $\odot$ calculates the angle between two vectors. $\partial$ denotes the balancing factor between the two terms. It is considered matching if the $\text{Cost}_{A,B}$ is below a threshold. Once the signature matches, update the signature with the latest one. This simplistic approach makes stable tracking with a minimal time.

The obstacles are tracked by comparing structural properties of obstacle appearance in the u-depth map by creating a signature of obstacle patch in the u-depth map, and iteratively for the one or more obstacles a closeness signature is searched within neighboring vicinity based on a shape alignment of each obstacle.

The signature is the shape alignment of obstacle in a u-depth image which is formed with a set of vectors and a centroid, wherein the vectors are formed with pixels obtained from the contour of the obstacle in the u-depth map as illustrated with an example in FIG. 6, wherein the centroid is the average coordinate position of all pixels obtained from the contour of the obstacle in the u-depth map.

The closeness signature is computed with the sum of differences derived between vectors of obstacle identified in the previous depth image and the vectors of obstacle identified in the next depth image starting from minimum column index.

At step 310 of the method 300 the one or more hardware processors 104 estimate by using a dynamic obstacle estimation module, the dynamic obstacles by converting the obstacles identified in the three-dimensional camera coordinates c into a world coordinate w and identifying dynamic obstacles based on velocity estimation is above a predefined threshold value.

Figure 7:
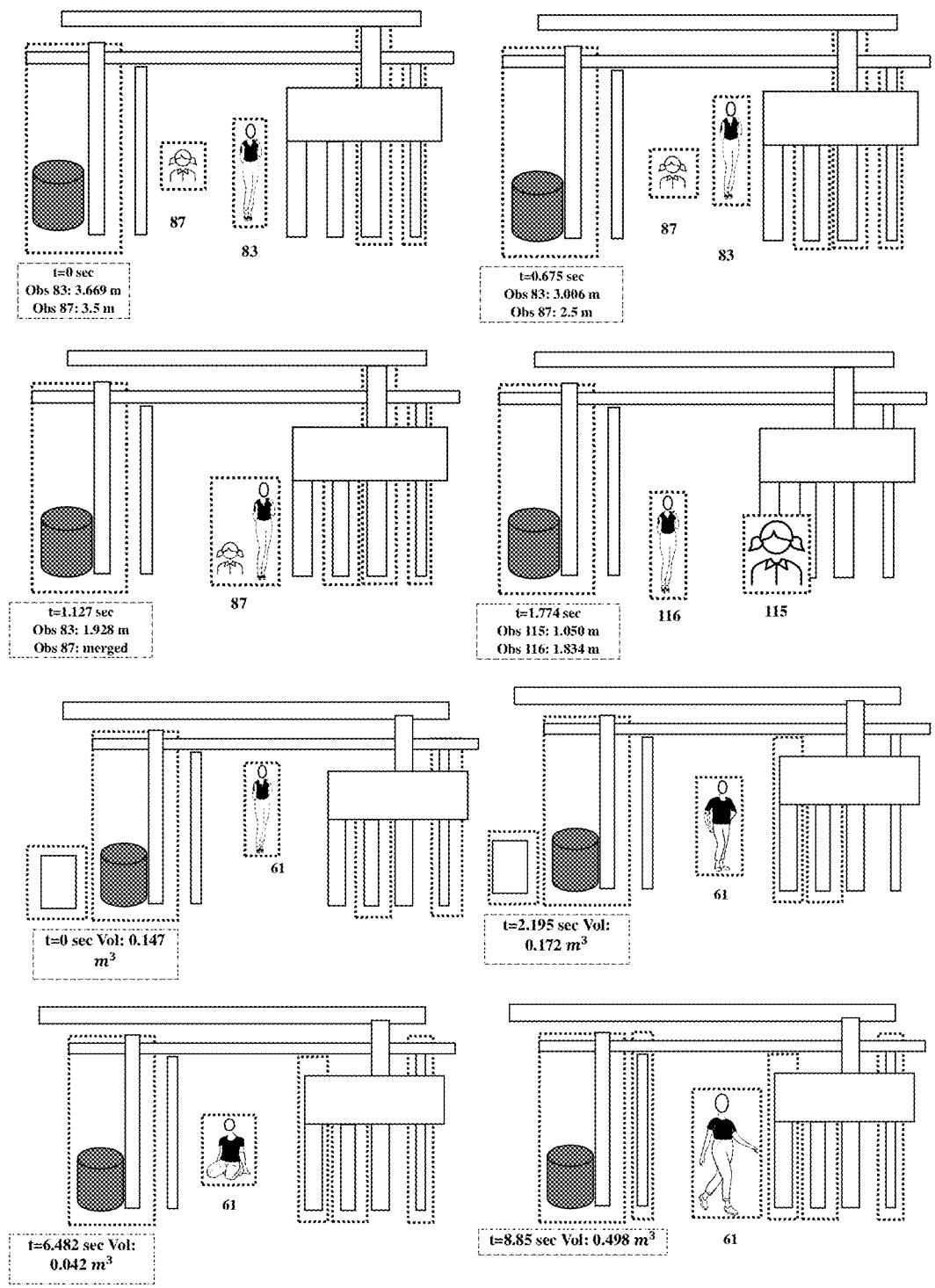
FIG. 7 illustrates performance of dynamic obstacle being tracked in an outdoor environment using the system of FIG. 1, in accordance with some embodiments of the present disclosure.
Figure 7:
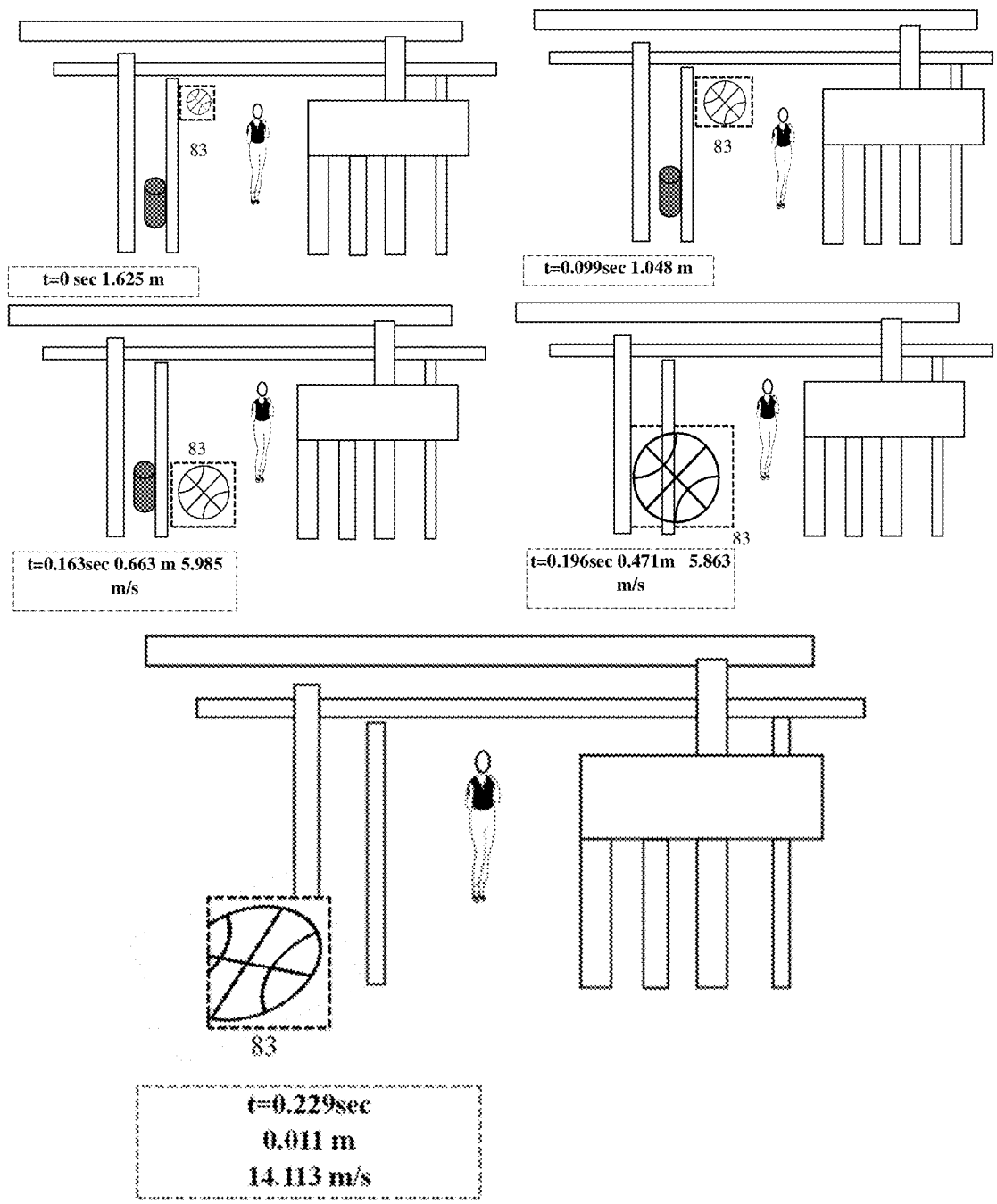

FIG. 7 illustrates performance of obstacle being tracked in an outdoor environment using the system of FIG. 1, in accordance with some embodiments of the present disclosure. FIG. 7 represents experimental results using a NVidia Jetson TX2® embedded computing board to implement the present method in C++ with ROS. The RealSense D435i®, transmits Red Green Blue-Depth RGB-D images of 848× 480 @60 Hz, for online evaluation and Open LORIS Scene dataset for offline evaluation because with best of our knowledge, we do not find any benchmark RGB-D dataset that contains ground truth positions of obstacle with time. It is to be noted that we are unable to produce any comparison with state-of-the-art approaches due to the unavailability of benchmark dataset. Localization and obstacle tracking uses RealSense D435i®. Experimental results shows obstacle detection module 204 and tracking module 206 jointly take 0.4 to 0.9 milliseconds for single obstacle irrespective of its size on the image frame and the average tracking time is about 4 to 5 ms for the entire image considering 5 obstacles. Therefore, the system 100 is capable of performing real-time with five obstacles or more with @60 Hz camera and dynamic obstacle tracking with maximum velocity of 2.5 m/see with a @60 Hz camera.

In one embodiment, the present method of the disclosure is evaluated in Outdoor Sequences. It is tested with two persons walking with different velocities and directions. The velocity is of about 1 m/sec and obstacles are crossing with proximity. The method considers two obstacles as single obstacle when they are within proximity and two separate obstacles as they become farther apart. The first row of FIG. 7 shows tracking results with estimated distances. The method evaluates dynamic obstacles that change its shape abruptly because this is very common in human motion. The 2nd row of FIG. 7 shows the result of a sequence where a person first walks with normal speed, bend down suddenly for 4 seconds, again stands & starts walking. The third row in FIG. 7 shows tracking results of fast-moving basketball with speed around 5 m/sec. The present method fails to detect the ball initially when it is far but is successful in detecting/tracking from about 1.625 m away with partially visible and track until it goes out of field of view (FOV). All snapshots presents the relative distances between the camera to the ball and estimated velocities. The average estimated velocity is of about 7.114 m/sec.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of obstacle detection and tracking. The embodiment, thus provides method and system to detect and estimate dynamic obstacles using Red Green Blue-Depth RGB-D sensors for robot navigation. Moreover, the embodiments herein further enable estimation of obstacles dimension accurately. The present disclosure adopts a fast three-dimensional obstacle detection approach to track dynamic obstacles with less computation and cost. The detection and tracking system runs on-board @60 Hz. The method achieves on average 0.6 ms per obstacle detection and tracking computation time and is successful to track obstacle with max speed 5 m/sec. Also, the system estimates obstacles of any size and shape using light-weight tracking algorithm that makes tracking of obstacles faster, thus making the system suitable for a 60 Hz camera.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method to detect and estimate dynamic obstacles using a Red Green Blue-Depth (RGB-D) sensor for robot navigation, the method comprising:
   capturing, one or more depth images using the RGB-D sensor configured to mounted on a mobile robot navigating through a monitoring environment and constructing a u-depth map using the one or more depth images, wherein the one or more depth images are processed to detect one or more obstacles being identified in the monitoring environment;
   detecting, one or more obstacles comprising at least one of a static obstacle or a dynamic obstacle in two dimensional space using the u-depth map by, (i) converting, the u-depth map into binary images based on a dynamic threshold using an image processing technique, wherein dynamic threshold means proportional with distance of the obstacle and provides importance to closer objects even with smaller size, (ii) estimating, a width of each obstacle based on a width of segmented white patch from the u-depth map, and (iii) estimating, a depth range of each obstacle between a minimum and a maximum row index of the segmented white patch from the u-depth map;
   computing, a restricted v-depth map between specified columns taken from a width of each dynamic obstacle of the u-depth map and within the depth range derived from the u-depth map, a height of each obstacle from the restricted v-depth map and transforming the height and the width of one or more obstacles from a two dimensional image coordinates into a three-dimensional camera coordinates c, wherein after detecting the one or more obstacles and estimating corresponding two dimensional sizes in the depth image, three dimensional parallelepiped shape of the one or more obstacles are determined with three dimensions size represented as ($^c dim_h$, $^c dim_w$, $^c dim_d$) and three dimensional position ($^c P_x$, $^c P_y$, $^c P_z$), where c denotes the camera coordinate frame;
   tracking, by creating signatures for each obstacle and tracking the one or more obstacles by matching closeness among signatures in subsequent u-depth images; and
   estimating, the dynamic obstacles by converting the obstacles identified in the three-dimensional camera coordinates c into a world coordinate w and identifying dynamic obstacles based on velocity estimation is above a predefined threshold value.

2. The processor implemented method as claimed in claim 1, wherein the restricted v-depth map estimates accurate height of each obstacle.

3. The processor implemented method as claimed in claim 1, wherein the obstacles are tracked by comparing structural properties of obstacle appearance in the u-depth map by creating a signature of obstacle patch in the u-depth map, and iteratively for the one or more obstacles a closeness signature is searched within neighboring vicinity based on a shape alignment of each obstacle.

4. The processor implemented method as claimed in claim 1, wherein the signature is the shape alignment of obstacle in a depth image which is formed with a set of vectors and a centroid, wherein the vectors are formed with pixels obtained from the contour of each obstacle in the u-depth map, wherein the centroid is a average coordinate position of all pixels obtained from the contour of the obstacle in the u-depth map.

5. The processor implemented method as claimed in claim 1, wherein the closeness signature is computed with the sum of differences derived between vectors of obstacle's signature identified in the previous depth image and the vectors of obstacle's signature identified in the next depth image starting from minimum column index.

6. The processor implemented method as claimed in claim 1, wherein the difference between vectors is computed with a sum of angle difference and squared length difference.

7. A system to detect and estimate dynamic obstacles using a Red Green Blue-Depth (RGB-D) sensor for robot navigation, comprising:
   a memory storing instructions;
   one or more communication interfaces; and
   one or more hardware processors coupled to the memory via the one or more communication interfaces, wherein the one or more hardware processors are configured by the instructions to:
   capture, one or more depth images using the RGB-D sensor configured to mounted on a mobile robot navigating through a monitoring environment and constructing a u-depth map using the one or more depth images, wherein the one or more depth images are processed to detect one or more obstacles being identified in the monitoring environment;
   detect, one or more obstacles comprising at least one of a static obstacle or a dynamic obstacle in two dimensional space using the u-depth map by, (i) converting, the u-depth map into binary images based on a dynamic threshold using an image processing technique, wherein dynamic threshold means proportional with distance of the obstacle and provides importance to closer objects even with smaller size, (ii) estimating, a width of each obstacle based on the width of segmented white patch from the u-depth map, and (iii) estimating, a depth range of each obstacle between a minimum and a maximum row index of the segmented white patch from the u-depth map;
   compute, a restricted v-depth map between specified columns taken from a width of each dynamic obstacle of the u-depth map and within the depth range derived from the u-depth map, a height of each obstacle from the restricted v-depth map, and transform the height and the width of one or more obstacles from the two dimensional image coordinates into a three-dimensional camera coordinates c, wherein after detecting the one or more obstacles and estimating corresponding two dimensional sizes in the depth image, three dimensional parallelepiped shape of the one or more obstacles are determined with three dimensions size represented as ($^c dim_h$, $^c dim_w$, $^c dim_d$) and three dimensional position ($^c P_x$, $^c P_y$, $^c P_z$), where c denotes the camera coordinate frame;
   track, the one or more obstacles by creating signatures for each obstacle and track the one or more obstacles by matching closeness among signatures in subsequent u-depth images; and estimate, the dynamic obstacles by converting the obstacles identified in the three-dimensional camera coordinates c into a world coordinate w and identifying dynamic obstacles based on velocity estimation is above a predefined threshold value.

8. The system of claim 7, wherein the restricted v-depth map estimates accurate height of each obstacle.

9. The system of claim 7, wherein the obstacles are tracked by comparing structural properties of obstacle appearance in the u-depth map by creating a signature of obstacle patch in the u-depth map, and iteratively for the one or more obstacles a closeness signature is searched within neighboring vicinity based on a shape alignment of each obstacle.

10. The system of claim 7, wherein the signature is the shape alignment of obstacle in a next depth image which is formed with a set of vectors and a centroid, wherein the vectors are formed with pixels obtained from the contour of the obstacle in the u-depth map, wherein the centroid is an average coordinate position of all pixels obtained from the contour of the obstacle in the u-depth map.

11. The system of claim 7, wherein the closeness signature is computed with the sum of differences derived between vectors of obstacle's signature identified in the previous depth image and the vectors of obstacle's signature identified in the next depth image starting from minimum column index.

12. The system of claim 7, wherein the difference between vectors is computed with a sum of angle difference and squared length difference.

13. One or more non-transitory machine-readable information storage mediums comprising one or more instructions which when executed by one or more hardware processors cause:
    capturing, one or more depth images using a Red Green Blue-Depth (RGB-D) sensor configured to mounted on a mobile robot navigating through a monitoring environment and constructing a u-depth map using the one or more depth images, wherein the one or more depth images are processed to detect one or more obstacles being identified in the monitoring environment;
    detecting, one or more obstacles comprising at least one of a static obstacle or a dynamic obstacle in two dimensional space using the u-depth map by, (i) converting, the u-depth map into binary images based on a dynamic threshold using an image processing technique,
    wherein dynamic threshold means proportional with distance of the obstacle and provides importance to closer objects even with smaller size, (ii) estimating, a width of each obstacle based on the width of segmented white patch from the u-depth map, and (iii) estimating, a depth range of each obstacle between a minimum and a maximum row index of the segmented white patch from the u-depth map;
    computing, a restricted v-depth map between specified columns taken from a width of each dynamic obstacle of the u-depth map and within the depth range derived from the u-depth map, a height of each obstacle from the restricted v-depth map and transforming the height and the width of one or more obstacles from the two dimensional image coordinates into a three-dimensional camera coordinates c, wherein after detecting the one or more obstacles and estimating corresponding two dimensional sizes in the depth image, three dimensional parallelepiped shape of the one or more obstacles are determined with three dimensions size represented as ($^c\text{dim}_h$, $^c\text{dim}_w$, $^c\text{dim}_d$) and three dimensional position ($^c P_x$, $^c P_y$, $^c P_z$), where c denotes the camera coordinate frame;
    tracking, by creating signatures for each obstacle and tracking the one or more obstacles by matching closeness among signatures in subsequent u-depth images; and
    estimating, the dynamic obstacles by converting the obstacles identified in the three-dimensional camera coordinates c into a world coordinate w and identifying dynamic obstacles based on velocity estimation is above a predefined threshold value.

14. The one or more non-transitory machine-readable information storage mediums of claim 13, wherein the restricted v-depth map estimates accurate height of each obstacle.

15. The one or more non-transitory machine-readable information storage mediums of claim 13, wherein the obstacles are tracked by comparing structural properties of obstacle appearance in the u-depth map by creating a signature of obstacle patch in the u-depth map, and iteratively for the one or more obstacles a closeness signature is searched within neighboring vicinity based on a shape alignment of each obstacle.

16. The one or more non-transitory machine-readable information storage mediums of claim 13, wherein the signature is the shape alignment of obstacle in a depth image which is formed with a set of vectors and a centroid, wherein the vectors are formed with pixels obtained from the contour of each obstacle in the u-depth map, wherein a centroid is the average coordinate position of all pixels obtained from the contour of the obstacle in the u-depth map.

17. The one or more non-transitory machine-readable information storage mediums of claim 13, wherein the closeness signature is computed with the sum of differences derived between vectors of obstacle's signature identified in the previous depth image and the vectors of obstacle's signature identified in the next depth image starting from minimum column index.

18. The one or more non-transitory machine-readable information storage mediums of claim 13, wherein the difference between vectors is computed with a sum of angle difference and squared length difference.

* * * * *